United States Patent
Ks et al.

(10) Patent No.: US 10,650,013 B2
(45) Date of Patent: May 12, 2020

(54) ACCESS OPERATION REQUEST MANAGEMENT

(71) Applicant: International Business Machines Corporation, Armonk, NY (US)

(72) Inventors: Venkatesh Babu Ks, Bangalore (IN); Chetan Babu Papaiah, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 568 days.

(21) Appl. No.: 15/375,428

(22) Filed: Dec. 12, 2016

(65) Prior Publication Data
US 2018/0165469 A1 Jun. 14, 2018

(51) Int. Cl.
G06F 16/2453 (2019.01)
G06F 16/25 (2019.01)
G06F 21/62 (2013.01)

(52) U.S. Cl.
CPC ........ G06F 16/252 (2019.01); G06F 16/2453 (2019.01); G06F 21/6227 (2013.01)

(58) Field of Classification Search
USPC ........................................................ 707/783
See application file for complete search history.

(56) References Cited

U.S. PATENT DOCUMENTS

| | | | | |
|---|---|---|---|---|
| 5,555,046 A * | 9/1996 | Meyerhoefer | ......... | G03B 15/05 396/201 |
| 7,373,338 B2 * | 5/2008 | Thompson | .......... | G06F 21/6227 707/690 |
| 8,615,528 B2 * | 12/2013 | Shah | .................... | G06F 21/6218 707/783 |
| 8,738,964 B2 * | 5/2014 | Markus | ............... | G06F 11/1474 714/20 |
| 8,775,425 B2 * | 7/2014 | Gupta | ............... | G06F 16/24532 707/737 |

(Continued)

FOREIGN PATENT DOCUMENTS

CN 104333512 A 2/2015

OTHER PUBLICATIONS

Mell, Peter, et al., The NIST Definition of Cloud Computing, National Institute of Standards and Technology, Oct. 7, 2009, Version 15, NIST, Gaithersburg, MD, US.

(Continued)

*Primary Examiner* — Cheyne D Ly
(74) *Attorney, Agent, or Firm* — Dmitry Paskalov

(57) ABSTRACT

Disclosed aspects relate to access operation management to a database management system (DBMS) on a shared pool of configurable computing resources having a set of members. A map of the set of table names to the set of members may be established. A query may be received which indicates the access operation request to the DBMS. The query may be parsed to identify a mentioned table name. In the query related to the access operation request to the DBMS, the mentioned table name may be identified. A specific member of the set of members may be selected by comparing the mentioned table name with the map. The specific member of the set of members may be configured to process the access operation request to the DBMS. The routing may be performed in order to process the access operation request to the DBMS.

18 Claims, 8 Drawing Sheets

(56) References Cited

U.S. PATENT DOCUMENTS

| | | | | |
|---|---|---|---|---|
| 2008/0016272 A1* | 1/2008 | Harrand | ............... | G11C 11/406 |
| | | | | 711/106 |
| 2008/0270459 A1* | 10/2008 | Grewal | ............... | G06F 16/256 |
| 2013/0198232 A1 | 8/2013 | Shamgunov et al. | | |
| 2013/0212085 A1* | 8/2013 | Nica | ............... | G06F 16/24532 |
| | | | | 707/718 |
| 2013/0311978 A1* | 11/2013 | Baumgart | ............... | G06F 8/54 |
| | | | | 717/140 |
| 2014/0032528 A1* | 1/2014 | Mandre | ............ | G06F 16/24542 |
| | | | | 707/718 |
| 2016/0117363 A1* | 4/2016 | Aguilera | ............ | G06F 16/2445 |
| | | | | 707/759 |

OTHER PUBLICATIONS

Oracle; "Node Affinity—A feature with high overhead; need scalable alternative"; <https://community.oracle.com/thread/1014619?tstart=0>, Dec. 10, 2016.

Oracle; "Node Affinity"; <https://community.oracle.com/thread/590609?start=0&tstart=0>, Dec. 10, 2016.

\* cited by examiner

ACCESS OPERATION REQUEST MANAGEMENT

BACKGROUND

This disclosure relates generally to computer systems and, more particularly, relates to access operation request management to a database management system (DBMS) on a shared pool of configurable computing resources. Databases are used to store information for numerous types of applications. Examples include various industrial, commercial, technical, scientific, and educational applications. DBMSs are a typical mechanism for accessing data stored in a database. DBMSs are typically configured to separate the process of storing data from accessing, manipulating, or using data stored in a database. DBMSs often require tremendous resources to handle the heavy workloads placed on such systems. As such, it may be useful to increase the performance of database management systems with respect to processing searches, or queries, to databases.

SUMMARY

Aspects of the disclosure relate to managing an access operation request to a database management system (DBMS) on a shared pool of configurable computing resources having a set of members. Aspects of the disclosure may be configured for use in both client-side and server-side environments. Access operation requests received by a DBMS may be redirected to specific tables of a specific member. A mapping may be generated that indicates specific tables on specific members for management of particular access operation requests. Based on the mapping, access operation requests received by the DBMS may be redirected to the corresponding table and member indicated by the mapping. An operational lock may be performed on the specific table configured to handle a particular access operation request, such that a global lock operation on other members may be avoided. The access operation request may be processed in a non-shared state, such that memory refreshes are not necessary on members other than the member hosting the specific table corresponding to the particular access operation request.

Disclosed aspects relate to an access operation request to a database management system (DBMS) on a shared pool of configurable computing resources. The shared pool of configurable computing resources may have a set of members. A map of the set of table names to the set of members may be established with respect to the DBMS on the shared pool of configurable computing resources. A respective table name of the set of table names may map to an indicated member of the set of members. A query may be received. The query may indicate the access operation request to the DBMS. The query may be parsed to identify a mentioned table name. In the query related to the access operation request to the DBMS, the mentioned table name may be identified. A specific member of the set of members may be selected by comparing the mentioned table name with the map. The specific member of the set of members may be configured to process the access operation request to the DBMS. The access operation request may be routed to the specific member of the set of members. The routing may be performed in order to process the access operation request to the DBMS.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
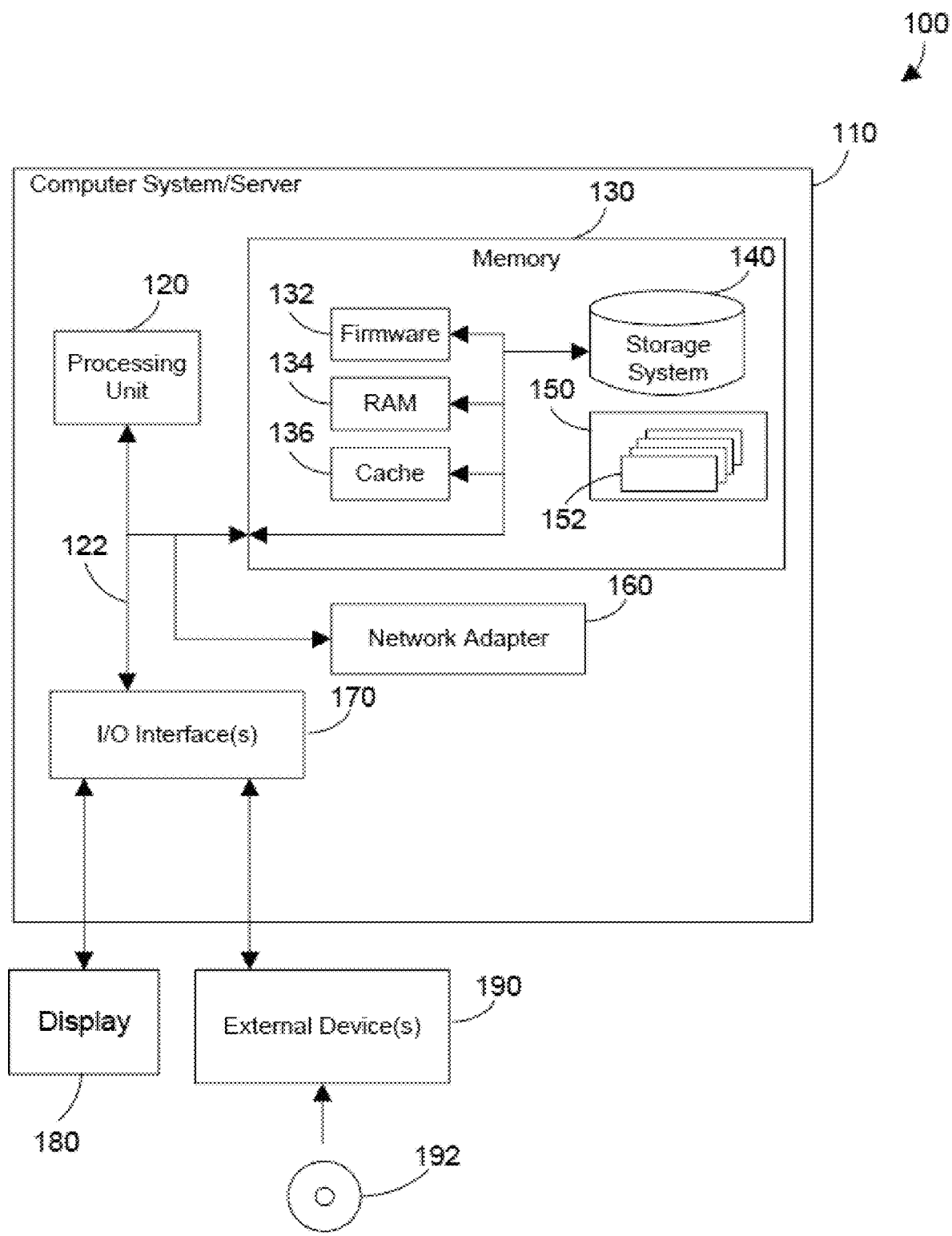
FIG. 1 depicts a cloud computing node according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to managing an access operation request to a database management system (DBMS) on a shared pool of configurable computing resources having a set of members. Aspects of the disclosure may be configured for use in both client-side and server-side environments. Access operation requests received by a DBMS may be redirected to specific tables of a specific member. A mapping may be generated that indicates specific tables on specific members for management of particular access operation requests. Based on the mapping, access operation requests received by the DBMS may be redirected to the corresponding table and member indicated by the mapping. An operational lock may be performed on the specific table configured to handle a particular access operation request, such that a global lock operation on other members may be avoided. The access operation request may be processed in a not-shared state, such that memory refreshes are not necessary on members other than the member hosting the specific table corresponding to the particular access operation request. Leveraging mappings to link access operation requests with specific tables and members may be associated with benefits including processor resource usage efficiency, application performance, and high availability.

In some database systems, workload balancing features may be provided to facilitate balancing database workloads across members in a group. Aspects of the disclosure relate to the recognition that, as the members of the group increase, performing database management operations simultaneously across multiple members may be associated with challenges with respect to resource management and flexibility (e.g., memory pages may need to be refreshed across multiple members, increased processor utilization as members work in a shared mode; global operational locks may restrict independent member operation). Accordingly, aspects of the disclosure relate to establishing a mapping between specific database tables and specific members, such that requests that pertain to particular database tables may be routed to specific members. The mapping between database tables and members may be maintained in both client-side and server-side environments. In this way, operational requests received by a DBMS may be routed to corresponding members indicated by the mapping and managed independently to facilitate resource efficiency and flexibility with respect to DBMS operations.

Aspects of the disclosure include a computer-implemented method, system, and computer program product for access operation management. The shared pool of configurable computing resources may have a set of members. A map of the set of table names to the set of members may be established with respect to the DBMS on the shared pool of configurable computing resources. A respective table name of the set of table names may map to an indicated member of the set of members. A query may be received. The query may indicate the access operation request to the DBMS. The query may be parsed to identify a mentioned table name. In the query related to the access operation request to the DBMS, the mentioned table name may be identified. A specific member of the set of members may be selected by comparing the mentioned table name with the map. The specific member of the set of members may be configured to process the access operation request to the DBMS. The access operation request may be routed to the specific member of the set of members. The routing may be performed in order to process the access operation request to the DBMS.

In embodiments, a table-specific operational lock may be carried out on a specific member of the set of members to process the access operation request to the DBMS. In embodiments, the table specific operational lock may be carried out on a specific member of the set of members without carrying-out a global operational lock on all members of the set of members to process the access operation request to the DBMS. In embodiments, a specific memory page for the specific member of the set of members may be refreshed without refreshing memory pages for all members of the set of members to process the access operation request to the DBMS. In embodiments, a non-shared state for the set of members may be maintained without switching to a shared state for the set of members. In embodiments, the map may be structured to route a first set of operations of a first application program to a first member of the set of members, and a second set of operations of a second application program to a second member of the set of members. Altogether, performance or efficiency benefits related to managing an access operation request may occur (e.g., speed, flexibility, security, load balancing, responsiveness, high availability, resource usage, productivity). Aspects may save computing resources such as bandwidth, processing, or memory.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
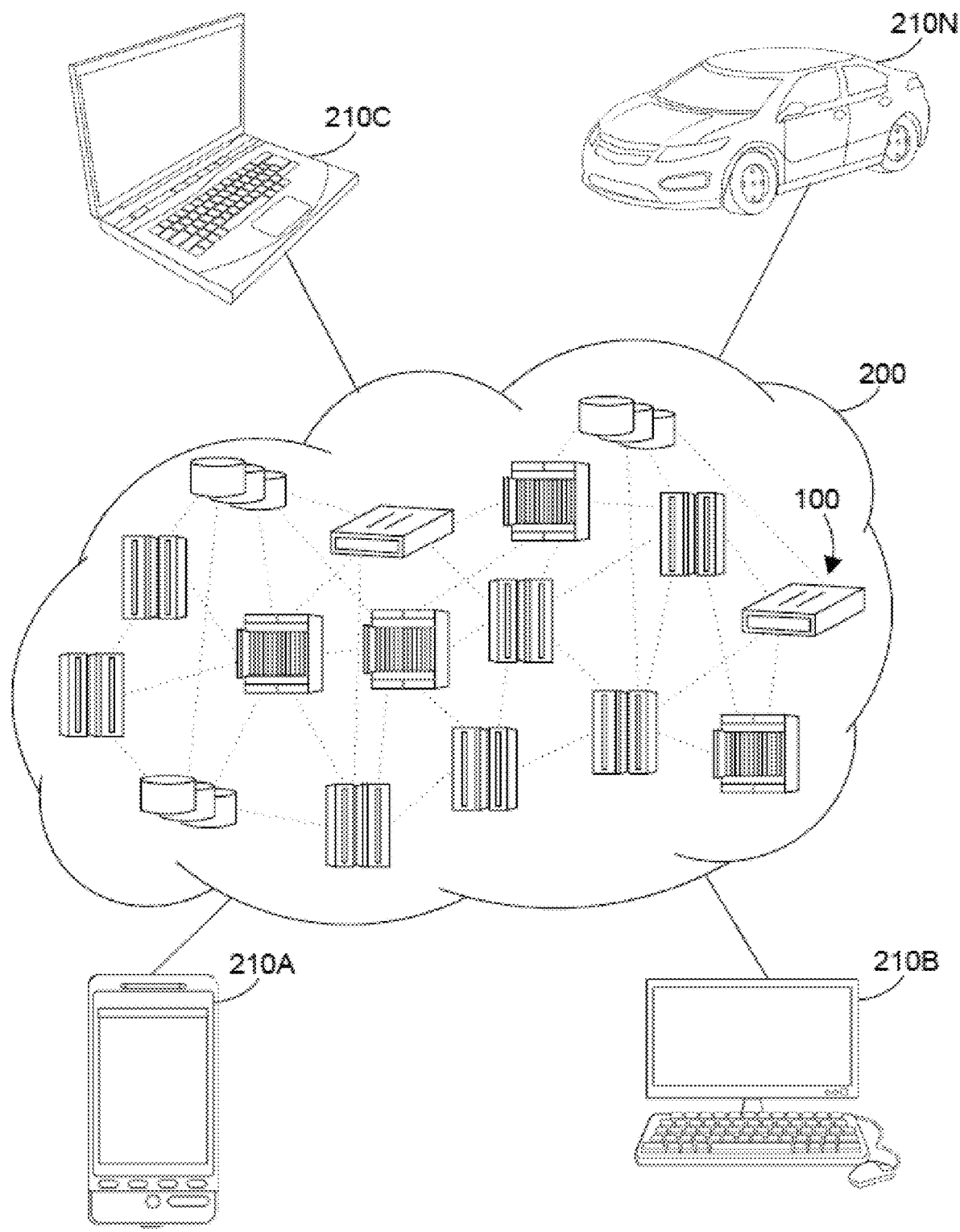
FIG. 2 depicts a cloud computing environment according to embodiments.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
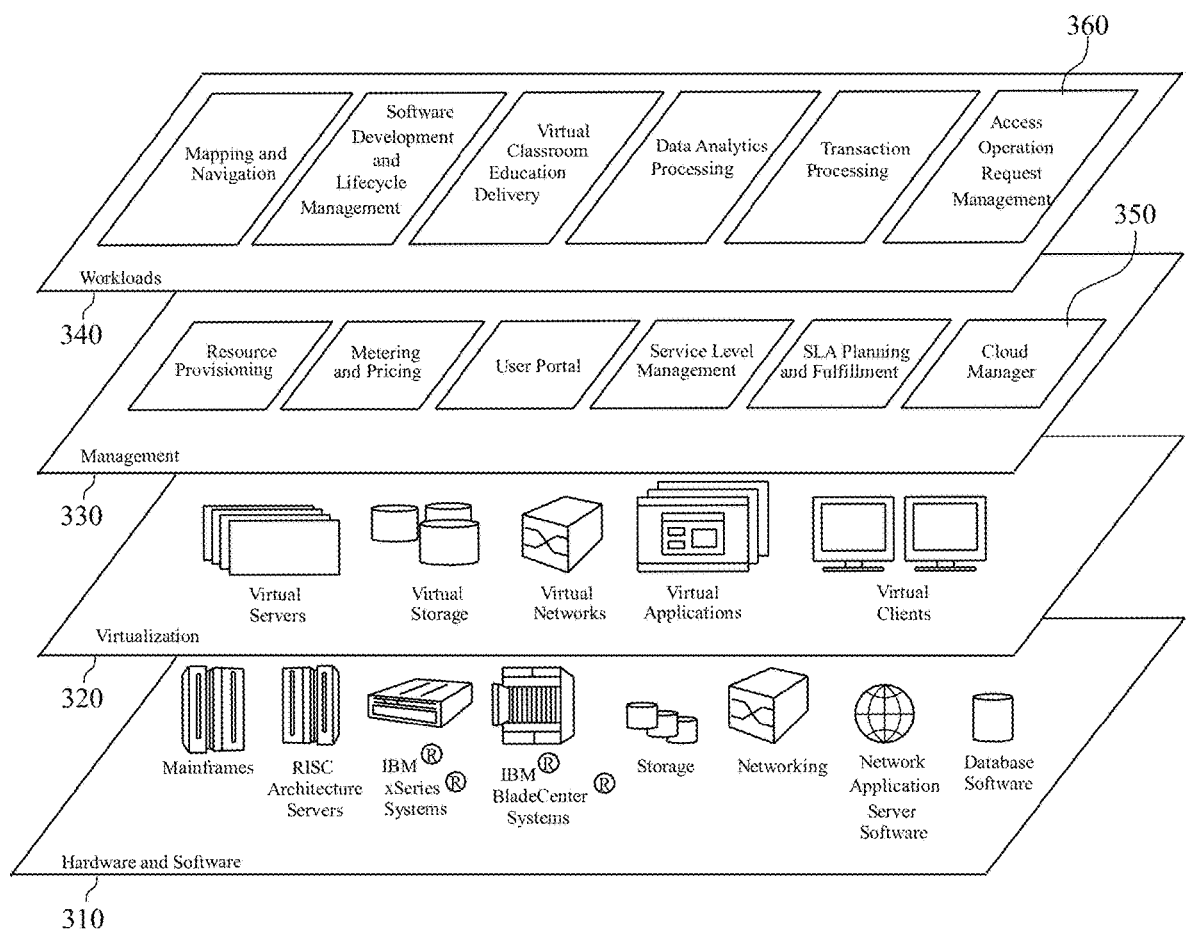
FIG. 3 depicts abstraction model layers according to embodiments.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM Web Sphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager (or shared pool manager) as described in more detail below. While the cloud manager 350 is shown in FIG. 3 to reside in the management layer 330, cloud manager 350 can span all of the levels shown in FIG. 3, as discussed below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and an access operation request management layer 360 as discussed in more detail herein.

Figure 4:
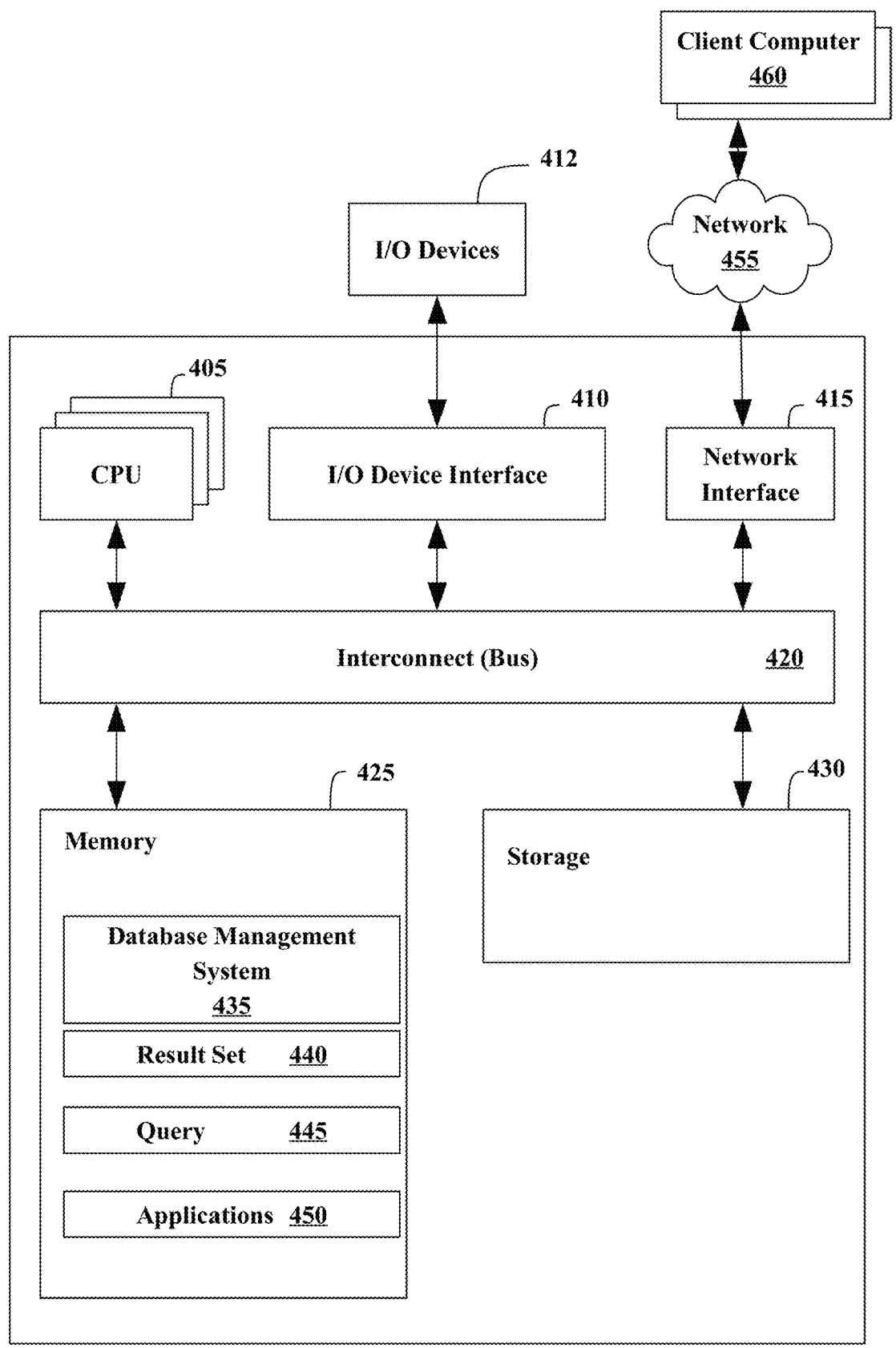
FIG. 4 illustrates an example representation of a computer system connected to a client computer via a network according to embodiments.

FIG. 4 illustrates an example representation of a computer system 400 connected to one or more client computers 460 via a network 455, according to some embodiments. For the purposes of this disclosure, computer system 400 may represent practically any type of computer, computer system, or other programmable electronic device, including but not limited to, a client computer, a server computer, a portable computer, a handheld computer, an embedded controller, etc. In some embodiments, computer system 400 may be implemented using one or more networked computers, e.g., in a cluster or other distributed computing system.

The computer system 400 may include, without limitation, one or more processors (CPUs) 105, a network interface 415, an interconnect 420, a memory 425, and a storage 430. The computer system 400 may also include an I/O device interface 410 used to connect I/O devices 412, e.g., keyboard, display, and mouse devices, to the computer system 400.

Each processor 405 may retrieve and execute programming instructions stored in the memory 425 or storage 430. Similarly, the processor 405 may store and retrieve application data residing in the memory 425. The interconnect 420 may transmit programming instructions and application data between each processor 405, I/O device interface 410, network interface 415, memory 425, and storage 430. The interconnect 420 may be one or more busses. The processor 405 may be a single central processing unit (CPU), multiple CPUs, or a single CPU having multiple processing cores in various embodiments. In one embodiment, a processor 405 may be a digital signal processor (DSP).

The memory 425 may be representative of a random access memory, e.g., Static Random Access Memory (SRAM), Dynamic Random Access Memory (DRAM), read-only memory, or flash memory. The storage 430 may be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 415 may be configured to transmit data via the communications network 455.

The memory 425 may include a database management system (DBMS) 435, a result set 440, a query 445, and applications 450. Although these elements are illustrated as residing in the memory 425, any of the elements, or combinations thereof, may reside in the storage 430 or partially in the memory 425 and partially in the storage 430. Each of these elements will be described in greater detail in accordance with FIG. 5.

The network 455 may be any suitable network or combination of networks and may support any appropriate protocol suitable for communication of data and/or code to/from the server computer system 400 and the client computer system 460. In some embodiments, the network 455 may support wireless communications. In other embodiments, the network 455 may support hardwired communications. The network 455 may be the Internet and may support Internet Protocol in some embodiments. In other embodiments, the network 455 may be implemented as a local area network (LAN) or a wide area network (WAN). The network 455 may also be implemented as a cellular data network. Although the network 455 is shown as a single network in the figures, one or more networks of the same or different types may be included.

The client computer system 460 may include some or all of the hardware and software elements of the computer system 400 previously described. As shown, there may be one or more client computers 460 connected to the computer system 400 via the network 455. In some embodiments, one or more client computers 460 may send a query 445 by network 455 to computer system 400 and receive a result set 440.

Figure 5:
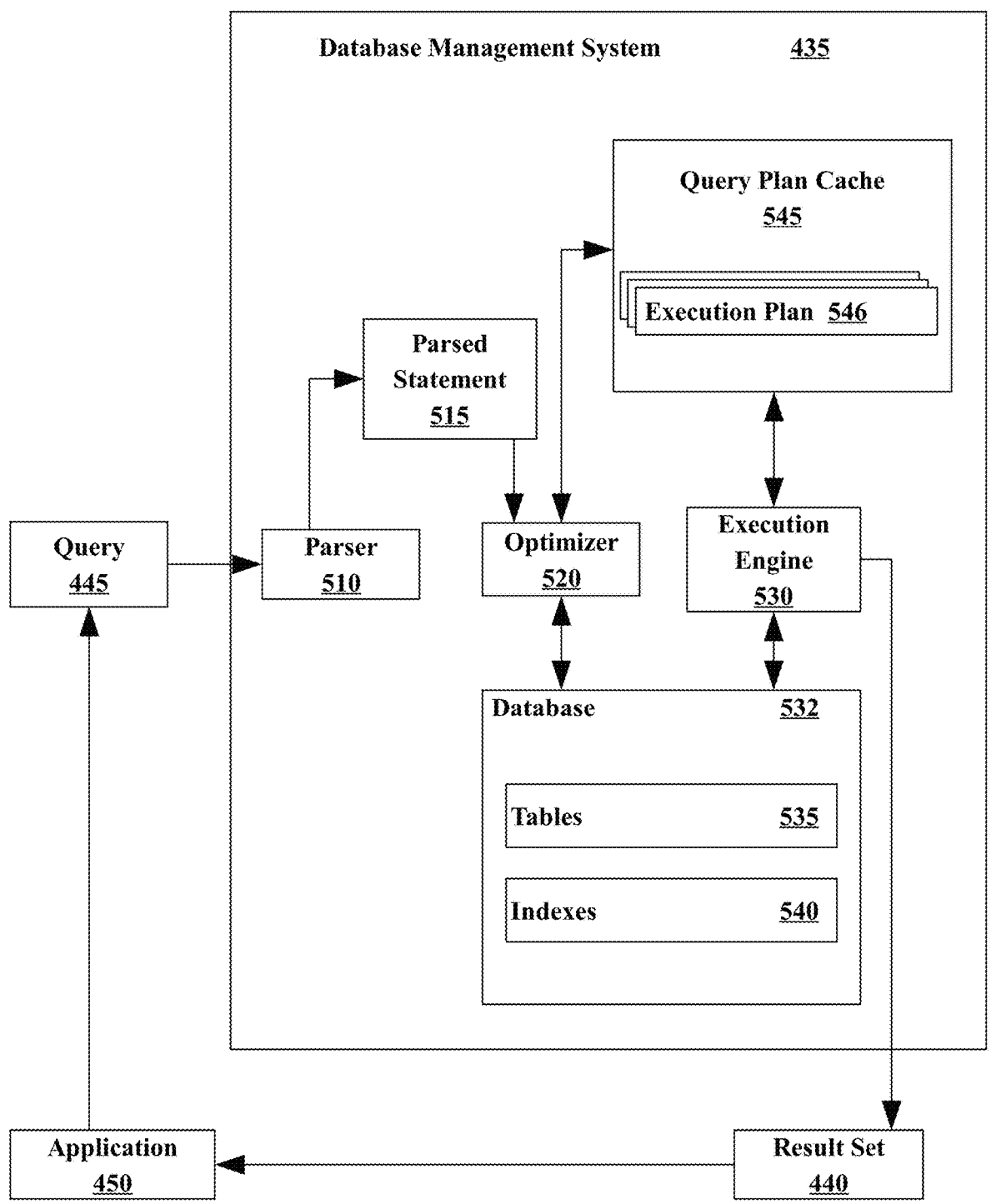
FIG. 5 illustrates an example database management system (DBMS) according to embodiments.

FIG. 5 illustrates an example database management system (DBMS) 435. The DBMS 435 may include a parser 510, an optimizer 520, an execution engine 530, and a database 532. The parser 510 may receive a database query 445 from an application 450. In some embodiments, the database query 445 may be in the form of a Structured Query Language (SQL) statement. The parser 510 may generate a parsed statement 515. The parser 510 may send the parsed statement 515 to an optimizer 520. The optimizer 520 may attempt to optimize the parsed statement. In some embodiments, optimizing may improve the performance of the database query 445 by, for example, reducing the amount of time it takes to provide a user with a response. The optimizer 520 may generate an execution plan 546 (may also be referred to as a query plan or an access plan), which may be maintained in a query plan cache 545, according to some embodiments. The query plan cache 545 may include one or more execution plans 546, including the current execution plan as well as previously used execution plans. Once an execution plan 546 is generated, the execution plan 546 may be sent to the execution engine 530. The execution engine 530 may execute the query 445. Executing the query 445 may include finding and retrieving data in the database tables 535 that satisfies the criteria supplied in the query 445. The execution engine 530 may store the data returned matching the query 445 in a result set 440. The DBMS 435 may return the result set 440 to an application 450, such as the application in which the database query 445 was generated, as a response to the database query 445.

A database 532 may include one or more tables 535 and, in some embodiments, one or more indexes 540. A database table 535 may organize data into rows and columns. Each row of a database table 535 may correspond to an individual entry, a tuple, or a record in the database 532. A column may define what is stored in each entry, tuple, or record. In some embodiments, columns of a table 535 may also be referred to as fields or attributes. Each table 535 within the database 532 may have a unique name. Each column within a table 535 may also have a unique name. A row, tuple, or record, however, within a particular table 535 may not be unique, according to some embodiments. A database 532 may also include one or more indexes 540. An index 540 may be a data structure that may inform the DBMS 435 of the location of a particular record within a table 535 if given a particular indexed column value. In some embodiments, the execution engine 530 may use the one or more indexes 540 to locate data within a table 535. In other embodiments, the execution engine 530 may scan the tables 535 without using an index 540.

As mentioned herein, the optimizer 520 creates the query access plan. The optimizer 520 may be implemented as computer program instructions that optimize the access plan in dependence upon database management statistics. Database statistics may reveal, for example, that there are only two identification values in a transactions table—so that it is an optimization, that is, more efficient, to scan the transactions table rather than using an index. Alternatively, database statistics may reveal that there are many transaction records with only a few transaction records for each identification value—so that it is an optimization, that is, more efficient, to access the transaction records by an index.

Figure 6:
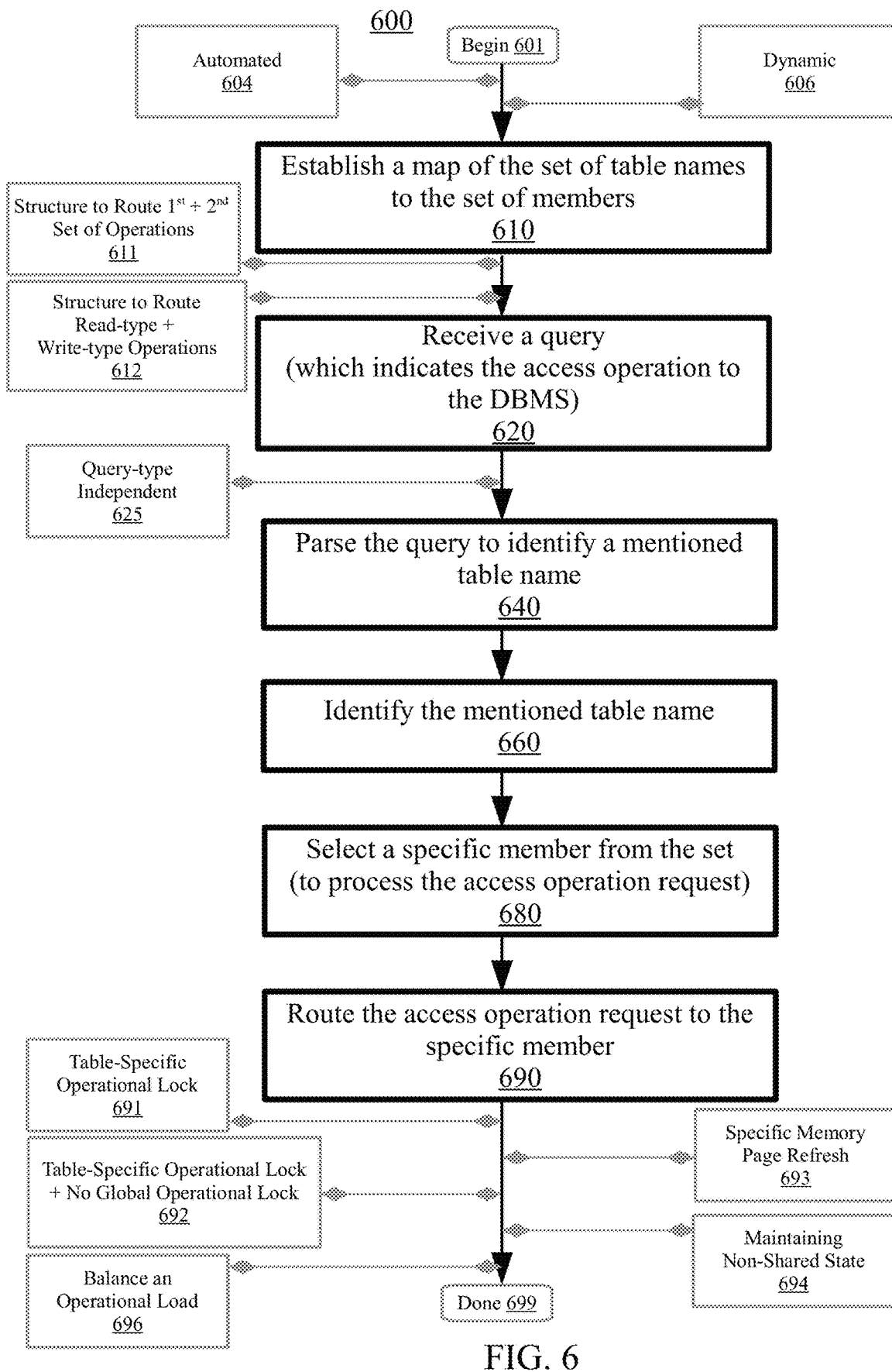
FIG. 6 is a flowchart illustrating a method for managing an access operation request to a database management system on a shared pool of configurable computing resources, according to embodiments.

FIG. 6 is a flowchart illustrating a method 600 for access operation request management, according to embodiments. Aspects of method 600 relate to routing an access operation request received by a database management system (DBMS) to a specific member of a set of members based on a map of a set of table names. The access operation request may include a query, set of instructions, command, request or other directive to perform an operation (e.g., task, process) in the DBMS. In embodiments, the DBMS may include a set of members. Generally, the set of members may include physical or logical computing units configured to run a particular relational database management software. As examples, the set of members can include servers, virtual machines, or the like. In embodiments, the set of members of the DBMS may be configured in the same logical group, such that each member can simultaneously access the same database for performance of both read and write operations. In embodiments, aspects of the disclosure may be implemented in both server-side and client-side environments. The method 600 may begin at block 601.

In embodiments, the establishing, the receiving, the parsing, the identifying, the selecting, the routing, and other steps described herein may each occur in an automated fashion without user intervention at block 604. In embodiments, the establishing, the receiving, the parsing, the identifying, the selecting, the routing, and other steps described herein may be carried out by an internal access operation request management module maintained in a persistent storage device of a local computing device (e.g., computer or server connected to a local network). In embodiments, the establishing, the receiving, the parsing, the identifying, the selecting, the routing, and other steps described herein may be carried out by an external access operation request management module hosted by a remote computing device or server (e.g., server accessible via a subscription, usage-based, or other service model). In this way, aspects of access operation request management may be performed using automated computing machinery without manual action. Other methods of performing the steps described herein are also possible.

In embodiments, the establishing, the receiving, the parsing, the identifying, the selecting, the routing, and other steps described herein may each occur in a dynamic fashion to manage the access operation request at block 606. For instance, the establishing, the receiving, the parsing, the identifying, the selecting, the routing, and other steps described herein may occur in real-time, ongoing, or on-the-fly. As an example, one or more steps described herein may be performed on-the-fly (e.g., access operation requests received by the DBMS may be parsed and routed to a specific member of the set of members in real-time as the request is received) in order to streamline (e.g., facilitate, promote, enhance) access operation request management.

At block 610, a map of a set of table names to the set of members may be established with respect to the DBMS on the shared pool of configurable computing resources. A respective table name of the set of table names may map to an indicated member of the set of members. Generally, establishing can include generating, constructing, arranging, building, organizing, assembling, structuring, instantiating, or otherwise creating the map of the set of table names to the set of members. The set of table names may include titles, labels, or other identifiers that indicate particular tables (e.g., data structures for organizing information) of the DBMS (e.g., Table A, Table B). The map may include an index, table, series, directory, or other collection or listing of the set of members of the DBMS and corresponding table names. In embodiments, each table name of the set of table names may map (e.g., correspond, link, pair with) a particular member of the set of members. For instance, the map may indicate that a Table C maps with a Member 2. In certain embodiments, a plurality of table names may map to the same member. As an example, the map may indicate that both a Table A and a Table B map to Member 1. In embodiments, establishing the map of the set of table names may include analyzing (e.g., evaluating, examining, assessing) the configuration of each member of the set of members to determine a set of access operation management characteristics (e.g., properties and attributes of a member that govern how a member handles different access requests, such as resource usage characteristics, security protocols, input/output traffic levels, past utilization history) and matching each member of the set of members with one or more tables based on the set of access management characteristics. For instance, a particular member associated with a set of access operation management characteristics indicating a processor speed above a threshold value may be matched with tables having a high frequency of "INSERT" requests (e.g., greater processing speed may leveraged to efficiently handle write-operations such as "INSERT" requests). Other methods of establishing the map of the set of table names to the set of members are also possible.

In embodiments, structuring of the first and second set of operations may occur at block 611. The map may be structured to route a first set of operations of a first application program to a first member of the set of members. The map may be structured to route a second set of operations of a second application program to a second member of the set of members. Generally, structuring can include setting, arranging, programming, organizing, instructing, or otherwise configuring the map to route a first set of operations of a first application to a first member, and a second set of operations of a second application to a second member. Aspects of the disclosure relate to the recognition that, in some situations, associating operations of particular applications with particular tables may be associated with access request management efficiency. Accordingly, in embodiments, the map may be structured to route a first set of operations (e.g., tasks, processes, database actions) of a first application program to a first member, and route a second set of operations of a second application program to a second member. The first and second application programs may include computer software applications, utilities, or instruction sets configured to execute particular tasks or functions. In embodiments, structuring the map may include configuring a set of operation routing parameters to indicate that application programs that achieve certain criteria (e.g., certain application program name, designated function, operation request frequency) are routed to specified members. As an example, the map may be configured such that a first set of operations received from a transaction management utility are routed to a first member, and a second set of operations received from an enterprise resource planning application are routed to a second member. Other methods of structuring the map to route a first set of operations to a first member and a second set of operations to a second member are also possible.

In embodiments, structuring of read-type and write-type operations may occur at block 612. The map may be structured to route a set of read-type operations to a first member of the set of members. The map may be structured to route a set of write-type operations to a second member of the set of members. Generally, structuring can include setting, arranging, programming, organizing, instructing, or otherwise configuring the map to route a set of read-type operations to a first member and a set of write-type operations to a second member. Aspects of the disclosure relate to the recognition that, in some situations, routing operations to members of the DBMS based on the type and nature of the operation may be associated with access request management efficiency. Accordingly, in embodiments, the map may be structured to route a set of read-type operations to a first member, and route a set of write-type operations to a second member. In embodiments, read-type operations may include database or processor actions in which stored data is accessed or retrieved from a memory location, and write operations may include database or processor actions in which data is saved or stored to a memory location. In embodiments, structuring the map may include configuring a set of operation routing parameters to indicate that operations that match designated operation types are routed to specified members. As an example, the map may be structured such that a first set of operations including a "SELECT" operation (e.g., a read-type operation) are routed to a first member, and a second set of operations including an "UPDATE" operation (e.g., a write-type operation) are routed to a second member. Other methods of structuring the map to route read-type operations to a first member and write-type operations to a second member are also possible.

At block 620, a query may be received. The query may indicate the access operation request to the DBMS. Generally, receiving can include detecting, sensing, discovering, collecting, recognizing, or otherwise accepting delivery of the query. The query may include an inquiry, set of instructions, commands, or requests for data or information from a database. The query may include a select query (e.g., data retrieval query), an action query (e.g., request for an operation such as insertion, updating, or deletion to be performed on a set of data), or other type of query. In embodiments, the query may be expressed in a query language such as SQL (Structured Query Language), CLSQL (Common List Structured Query Language), SchemeQL (Scheme Query Language), or the like. In certain embodiments, the query may include one or more subqueries. As described herein, the query may indicate the access operation request to the DBMS. As an example, the query may specify a particular access operation (e.g., INSERT, UPDATE, SELECT) for execution/performance with respect to a particular table of the DBMS. In embodiments, receiving the query may include detecting an access operation request submitted to the DBMS by a user or administrator via a user interface. In certain embodiments, receiving may include sensing a query specified by an access operation request transmitted to the DBMS by an external application program or server. Other methods of receiving the query indicating the access operation request to the DBMS are also possible.

In embodiments, the access operation request may be managed by the DBMS without regard to a query-type of the query at block 625. Generally, managing can include regulating, performing, controlling, resolving, governing, or otherwise handling the access operation request. Aspects of the disclosure relate to the recognition that, in certain embodiments, managing access operation requests based on a mapping between a particular table and a particular DBMS member without regard to a query-type of the query may be associated with resource efficiency. The query-type may include an attribute of the query that indicates the function, behavior, or operation, of a particular query. As examples, the query-type may include SELECT, INSERT, UPDATE, or the like. In embodiments, managing the access operation request may include routing the access operation request to a particular member without distinguishing the query type of the access operation request. For instance, the query may be received by the DBMS and subsequently transferred to a particular DBMS member without ascertaining or taking the query type into account. As examples, managing the query without regard to the query-type of the query may include ignoring, omitting, neglecting, or otherwise disregarding the query-type of the query. Other methods of managing the access operation request without regard to the query type of the query are also possible.

At block 640, the query may be parsed to identify a mentioned table name. Generally, parsing can include analyzing, investigating, scanning, evaluating, inspecting, or otherwise examining the query to identify a mentioned table name. The mentioned table name may include a table name (e.g., title, label, or other identifier that indicates a particular table) that is explicitly or implicitly referenced by the query. For instance, the query may explicitly reference a particular table name in order to specify a table as the target of a database operation. In embodiments, parsing may include utilizing a query parsing tool configured to break-down the structure (e.g., syntax, components) of the query, and ascertain that one or more table names are mentioned by the query. As an example, in response to receiving a query, the query parsing tool may analyze the contents of the query, and determine that one or more operations (e.g., SELECT, INSERT, UPDATE) specified by the query call-out, invoke, allude, or otherwise reference a particular table name (e.g., Table C). In certain embodiments, parsing may include determining that a table name is implicitly referenced by the query (e.g., the query may call/invoke an operation or table that includes, references another table). Other methods of parsing the query to identify the mentioned table name are also possible.

At block 660, the mentioned table name may be identified. The identification may occur from within the query related to the access operation request to the DBMS. Generally, identifying can include detecting, sensing, recognizing, distinguishing, discovering, ascertaining, or otherwise determining the mentioned table name. In embodiments, identifying may include extracting the mentioned table name from the query in response to parsing the query. In embodiments, identifying the mentioned table name may based on a set of table identification criteria. The set of table identification criteria may specify particular attributes, properties, conditions, parameters, or qualities that serve as a basis for identification of the mentioned table name. As examples, the set of table identification criteria may include a position criterion (e.g., where the table is referenced in the query; first data structure, last data structure, before code line 15), a reference frequency threshold criterion (e.g., how many times the table is referenced within the query by bit count), a recency criterion (e.g., how recently the mentioned table was created), or the like. Accordingly, in situations in which the query references multiple tables, the set of table identification criterion may be used to determine a particular mentioned table based on the set of table identification criteria. As an example, the set of table identification criteria may indicate that the table that is mentioned the greatest number of times may be selected as the mentioned table name.

Consider the following example. The DBMS may receive the following query:

| | |
|---|---|
| SELECT | BDATE, ADDRESS |
| FROM | (EMPLOYEE.TABLE) |
| WHERE | FNAME= 'John' AND MINIT='B' |
| AND | LNAME='Smith' |

As described herein, the query may be parsed using a query parsing tool configured to analyze the syntax of the query. In response to parsing the query, it may be ascertained that the query makes reference to a table of "EMPLOYEE.TABLE" within a "FROM" operation of the query. Accordingly, as described herein, the table of "EMPLOYEE.TABLE" may be identified as the mentioned table name by the query parsing tool. Other methods of identifying the mentioned table name are also possible.

At block 680, a specific member of the set of members may be selected. The selection may occur by comparing the mentioned table name with the map. The specific member of the set of members may be configured to process the access operation request to the DBMS. Generally, selecting can include choosing, picking, electing, specifying, ascertaining, determining, or otherwise designating the specific member of the set of members. In embodiments, as described herein, aspects of the disclosure relate to using a map of a set of table names to a set of DBMS members in order to assign particular access operation requests to specific members. Accordingly, aspects of the disclosure relate to comparing the mentioned table name with the map to select a specific member to process the access operation request. In embodiments, comparing may include examining the mentioned table name with respect to the map, and ascertaining that the mentioned table corresponds (e.g., achieves a similarity threshold) with a table name listed in the map. In response to locating a table name in the map that corresponds to the mentioned table of the query, a specific member coupled with the identified table name may be determined (e.g., as indicated by the map). As an example, consider that a query received by the DBMS references a "Table M." The "Table M" may be identified from the query, and compared with the map of table names and DBMS members. In response to locating a data entry in the map corresponding to "Table M," a DBMS member of "Member 5" (e.g., the member corresponding to "Table M" in the map) may be selected. The specific member may be configured to process the access operation request that included the query that referenced "Table M." Other methods of selecting a specific member of the set of members to process the access operation request to the DBMS are also possible.

At block 690, the access operation request may be routed to the specific member of the set of members to process the access operation request to the DBMS. Generally, routing may include transmitting, conveying, relaying, directing, conducting, or otherwise sending the access operation request to the specific member of the set of members to process the access operation request to the DBMS. Aspects of the disclosure relate to the recognition that, in some embodiments, managing access operation requests by specific DBMS members may be associated with resource usage efficiency (e.g., memory page refreshes may be reduced) and operation flexibility (e.g., global operation locks may be avoided). Accordingly, aspects of the disclosure relate to routing an access operation request to a specific member of the set of members based on a map of table names and the set of members. In embodiments, routing may include assigning the access operation request to the specific member, and transferring the access operation request to the specific member for processing to the DBMS. For instance, in response to detecting that an access operation request references a "Table B" that corresponds to a "Member 3," the access operation request may be forwarded, distributed, transmitted, conveyed, or otherwise routed to "Member 3." In embodiments, routing may include configuring input/output parameters for one or more members of the set of members such that, regardless of which member originally receives the access operation request, the member that received the access operation request may be configured to route or convey the access operation request to the specific member to which it corresponds. Other methods of routing the access operation request to the specific member are also possible.

In embodiments, a table-specific operational lock on the specific member of the set of members may occur at block 691. The table-specific operational lock may be carried out to process the access operation request to the DBMS. Aspects of the disclosure relate to the recognition that, in some situations, operational locks may be performed with respect to one or more tables of a database in order to preserve consistency, and allow for access operation requests and other modifications to be made to tables without interruption. Accordingly, in embodiments, a table-specific operational lock may be carried out with respect to a specific member of the set of members. Generally, carrying-out can include performing, initiating, instantiating, establishing, implementing, or otherwise executing the table-specific operational lock. The table-specific operational lock may include a restriction, constraint, rule, or other regulation that limits, prevents, or inhibits one or more actions with respect to a particular table. As examples, the table-specific operational lock may include read-only, read-key, read-data, write-data, write-key, write-blocking, read-schema, write-schema, and other types of operational locks. In embodiments, the operational lock may be instituted with respect to a specific table on a specific member. As an example, in the event that a query that references a "Table D" is selected to be routed (e.g., for processing) to a "Member 3," then "Table D" on "Member 3" may be locked (e.g., and not Table D on other members of the set of members). In embodiments, the table-specific operational lock may remain in place until processing operations of the access operation request have been completed. Other methods of carrying-out the table-specific operational lock are also possible.

In embodiments, a table-specific operational lock may occur without a global operational lock at block 692. The table-specific operational lock on the specific member of the set of members may be carried out to process the access operation request to the DBMS. The carrying-out of the table-specific operational lock may occur without carrying out a global operational lock on all members of the set of members to process the access operation request to the DBMS. Generally, carrying-out can include performing, initiating, instantiating, establishing, implementing, or otherwise executing the table-specific operational lock without the global operational lock. In some instances, access operation requests may be processed in a shared-state, such that a global operation lock is performed on the same table name hosted by multiple members of the set of members. Aspects of the disclosure relate to the recognition that processing access operation requests in such a configuration may negatively impact processing flexibility (e.g., as multiple tables are locked, blocking operations) and resource efficiency (e.g., additional processing resources are required to perform the global operation lock). Accordingly, aspects of the disclosure relate to performing the table-specific operation lock without a global-operation lock. The global-operation lock may include a restriction, constraint, rule, or other regulation that limits, prevents, or inhibits one or more actions with respect to one or more tables on one or more members of the set of members. In embodiments, performing the table-specific operational lock may include configuring the set of members in a non-shared state, and initiating the table-specific operational lock with respect to the particular table and a specific member associated with an access operation request (e.g., as indicated by the map of table names and the set of members) such that other members of the set of members may remain free to perform other operations. Other methods of carrying-out the table-specific operational lock without the global-operational lock are also possible.

In embodiments, a specific memory page refresh may occur at block 693. A specific memory page for the table-specific operational lock on the specific member of the set of members may be refreshed to process the access operation request to the DBMS. The refreshing of the specific memory page may occur without refreshing memory pages for all members of the set of members to process the access operation request to the DBMS. Generally, refreshing can include loading, clearing, revising, or otherwise re-writing a specific memory page. Aspects of the disclosure relate to the recognition that, in some embodiments, processing an access operation request in a shared mode between different members may be associated with resource utilization efficiency challenges, as memory pages are refreshed on each member of the group (e.g., requiring additional processing resources). Accordingly, aspects of the disclosure relate to performing a specific memory page refresh for the table-specific operational lock on the specific member of the set of members (e.g., and not performing memory page refreshes on other members of the set of members). In embodiments, performing the specific memory page refresh may include reading information from one or more memory addresses of the specific member (e.g., the cache) and subsequently rewriting the read information to the same area without modification (e.g., to preserve the information). In embodiments, the specific memory page refresh may be performed on the specific member that is designated to process the access operation request. As an example, in the event that a query that references a "Table Q" is selected to be routed (e.g., for processing) to a "Member 11," then the specific memory-page refresh may be performed on "Member 11" (e.g., and not on other members of the set of members). Other methods of performing the specific memory-page refresh are also possible.

In embodiments, a non-shared state may be maintained at block 694. The non-shared state for the set of members may be maintained to process the access operation request to the DBMS. The maintaining of the non-shared state may occur without switching to a shared state for the set of members. Aspects of the disclosure relate to the recognition that, in some situations, managing access operation requests on DBMS members in a shared state may negatively impact operational flexibility (e.g., multiple members may be affected by a global operational lock) and resource efficiency (e.g., memory pages may be refreshed on multiple members, resulting in additional processing resource usage). Accordingly, aspects of the disclosure relate to maintaining a non-shared state for the set of members. Generally, maintaining can include preserving, continuing, keeping, providing, or otherwise sustaining, the non-shared state. The non-shared state may include a configuration in which each member of the set of members operates independently of one another, such that access operation requests are managed autonomously by specific members. In embodiments, maintaining the shared state may include configuring read and write access permissions for the set of members such that each member is only allowed to perform database operations with respect to the tables assigned to it by the map of the set of table names and the set of members. In this way, access operation requests may be processed independently by a specific member indicated by the map, and operational flexibility and resource utilization efficiency may be facilitated. Other methods of maintaining the non-shared state are also possible.

In embodiments, an operational load may be balanced at block 696. The operational load for the set of members may be balanced based on both the mentioned table name and the map of the set of table names to the set of members. Generally, balancing may include adjusting, proportioning, stabilizing, equalizing, or otherwise managing the operational load. In embodiments, balancing may include dividing the number of tables assigned to each member of the set of members. For instance, in certain embodiments, balancing may include assigning an equal number of tables names to each member of the set of members. As an example, in a situation in which a database includes 12 tables and a set of members has 4 members, each member of the set of members may be assigned 3 tables. In embodiments, balancing may include dividing the tables between the set of members based on the computing resource load required by each table. As an example, in a situation in which a database includes a Table A requiring 3 gigahertz of processing power and 3 gigabytes of memory, a Table B requiring 2 gigahertz of processing power and 1 gigabytes of memory, a Table C requiring 1 gigahertz of processing power and 1 gigabytes of memory, and a Table D requiring 2 gigahertz of processing power 3 gigabytes of memory, Table A and Table C may be placed together on a first member, and Table B and Table D may be placed together on a second member such that each member manages tables requiring a total of 4 gigahertz of processing power and 4 gigabytes of memory. Other methods of balancing the operational load based on access operation request frequency, table size, or other factors are also possible.

Consider the following example. The following map of a set of table names and a set of members may be established in cache data storage for each member of the set of members:

table_name1-member1
table_name2-member1
table_name3-member1
. . .
table_name50-member2
table_name51-member2
table_name52-member2

As described herein, a query which indicates an access operation request to the DBMS may be received (e.g., by one or more members of the set of members). For instance, a query that specifies an "INSERT" operation with respect to a "table_name3" may be received by a member of the set of members. The query may be parsed using a query parsing tool to analyze the syntactic content and structure of the query. In embodiments, based on parsing the query, a mentioned table name of "table_name3" may be identified. The mentioned table name of "table_name3" may be compared with the map of table names and corresponding members, and it may be determined that "table_name3" corresponds with a "member1" of the set of members. Accordingly, the access operation request may be routed (e.g., assigned, transmitted, sent, forwarded) to "member1" for processing to the DBMS. As described herein, a table-specific operational lock and a member specific memory page refresh may be initiated with respect to "member1," and memory page refreshes and operational locks on other members of the set of members may be avoided. Other methods of managing an access operation request are also possible.

The example system 600 concludes at block 699. The example system 600 may provide performance or efficiency benefits for access operation request management. As an example, access operation requests to a DBMS may be processed independently by specific DBMS members in a non-shared state such that global operational locks and memory page refreshes affecting multiple members may be avoided (e.g., global operational locks and memory pages refreshes may cost additional memory and processing resources). Altogether, leveraging mappings to link access operation requests with specific tables and members may be associated with benefits including processor resource usage efficiency, application performance, and high availability.

Figure 7:
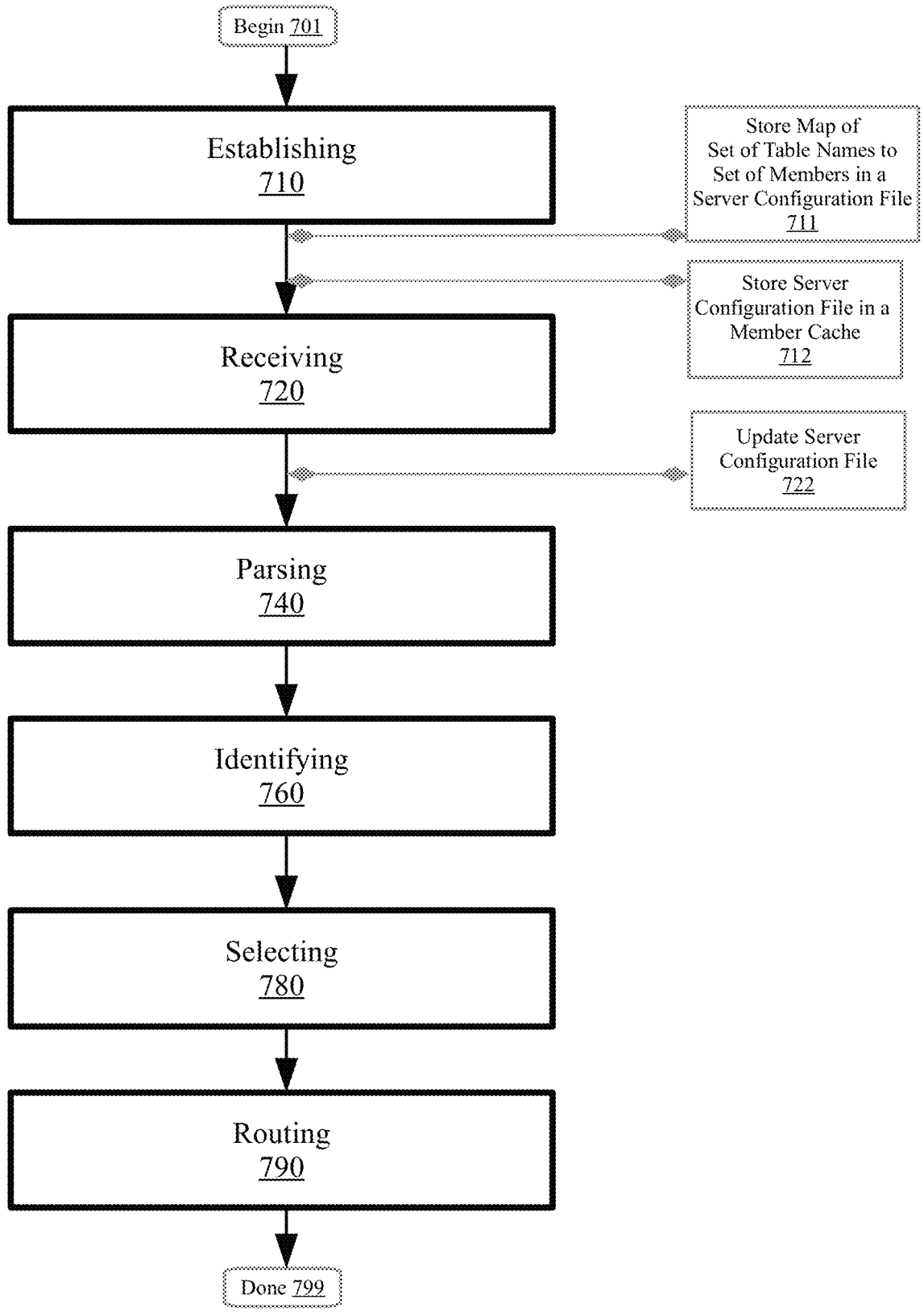
FIG. 7 is a flowchart illustrating a method for managing an access operation request to a database management system on a shared pool of configurable computing resources, according to embodiments.

FIG. 7 is a flowchart illustrating a method 700 for access operation request management, according to embodiments. Aspects of FIG. 7 relate to implementing aspects of access operation request management in a server side environment. Aspects of method 700 may be similar or the same as aspects of method 600, and aspects may be utilized interchangeably with one or more methodologies described herein. The method 700 may begin at block 701. At block 710, a map of a set of table names to the set of members may be established with respect to the DBMS on the shared pool of configurable computing resources. At block 720, a query may be received. The query may indicate the access operation request to the DBMS. At block 740, the query may be parsed to identify a mentioned table name. At block 760, the mentioned table name may be identified in the query related to the access operation request to the DBMS. At block 780, a specific member of the set of members may be selected by comparing the mentioned table name with the map. At block 790, the access operation request may be routed to the specific member of the set of members to process the access operation request to the DBMS.

In embodiments, the map of the set of table names to members may be stored in a server configuration file at block 711. The map of the set of table names to the set of members may be stored in the server configuration file by a server of the shared pool of configurable computing resources. In embodiments, as described herein, aspects of access operation request management may be implemented in a server-side environment. Accordingly, in embodiments, the map of a set of table names may be stored in a server configuration file by a server. Generally, storing can include recording, saving, caching, or otherwise maintaining the map in the server configuration file. The server configuration file may include a file that contains a collection of instructions, parameters, settings, directives, and other information that defines how a particular server (e.g., DBMS member) operates. For instance, the server configuration file may designate which processes to initiate on startup, how to handle particular types of requests/operations, which members are part of which logical groups, and the like. In embodiments, storing the map may include generating a new section within the configuration file, and saving the map in a machine-readable format (e.g., such that the server may interpret and implement the specified mapping) in the newly-created section. Accordingly, in certain embodiments, in response to receiving an access operation request, a member may consult the map stored in the server configuration file to facilitate routing of the request to the corresponding member specified by the map. Other methods of storing the map in the server configuration file are also possible.

In embodiments, a server configuration file may be stored in a set of caches of the set of members at block 712. A respective member of the set of members may include a respective cache of the set of caches. Generally, storing can include recording, saving, caching, or otherwise maintaining the server configuration file in a set of caches of the set of members. The set of caches may include a portion of high-availability (e.g., continuously accessible to a processor or database manager), low-latency memory configured to store data used by the DBMS. In embodiments, storing may include saving the server configuration file in a distinct cache of each member of the set of members. For example, for a set of members including 8 members, the server configuration file including the map may be written into a cache of each of the 8 members. In embodiments, the server configuration file may define input/output parameters for each member of the set of members such that, regardless of which member originally receives an access operation request, the member that received the access operation request may be configured to route or convey the access operation request to the specific member to which it corresponds based on the saved map of table names and members. Other methods of storing the server configuration file in a set of caches of the set of members are also possible.

In embodiments, a server configuration file may be updated at block 722. In response to activation of the DBMS, the server configuration file may be updated. The update of the server configuration file may occur by the server in a dynamic fashion. Generally, updating may include amending, revising, modifying, upgrading, renewing, or otherwise bringing the server configuration file up to date. Aspects of the disclosure relate to the recognition that, in some situations, it may be desirable to adjust the mapping stored in the server configuration file in response to activation of the DBMS. Accordingly, in embodiments, aspects of the disclosure relate to dynamically (e.g., in real-time, ongoing, on the fly) updating the server configuration file(s) including the table name and member mappings. In embodiments, updating may include modifying the mapping between the set of table names and the set of members. For instance, one or more table names may be reassigned to a different member of the set of members, members may be added or deleted from the set of members and the set of table names may be redistributed, or the like. In embodiments, as described herein, the server configuration file may be updated in response to activation of the DBMS (e.g., initiating an operation, processing an access operation request). As an example, consider a situation in which a particular member initiates processing of a query with respect to a Table L, but one or more database operations fail to complete as a result of the system configuration of the member (e.g., insufficient system resources, bandwidth, security parameters). Accordingly, the server configuration file may be updated to reassign Table L to a different member of the set of members to facilitate access operation request management. In embodiments, the changes to the server configuration file may be synchronized across multiple copies of the server configuration file maintained by other members of the set of members. Other methods of updating the server configuration file in response to activation of the DBMS are also possible. The example system 700 concludes at block 799. The example system 700 may provide performance or efficiency benefits (e.g., resource usage efficiency, high availability, operational flexibility) for access operation request management.

Figure 8:
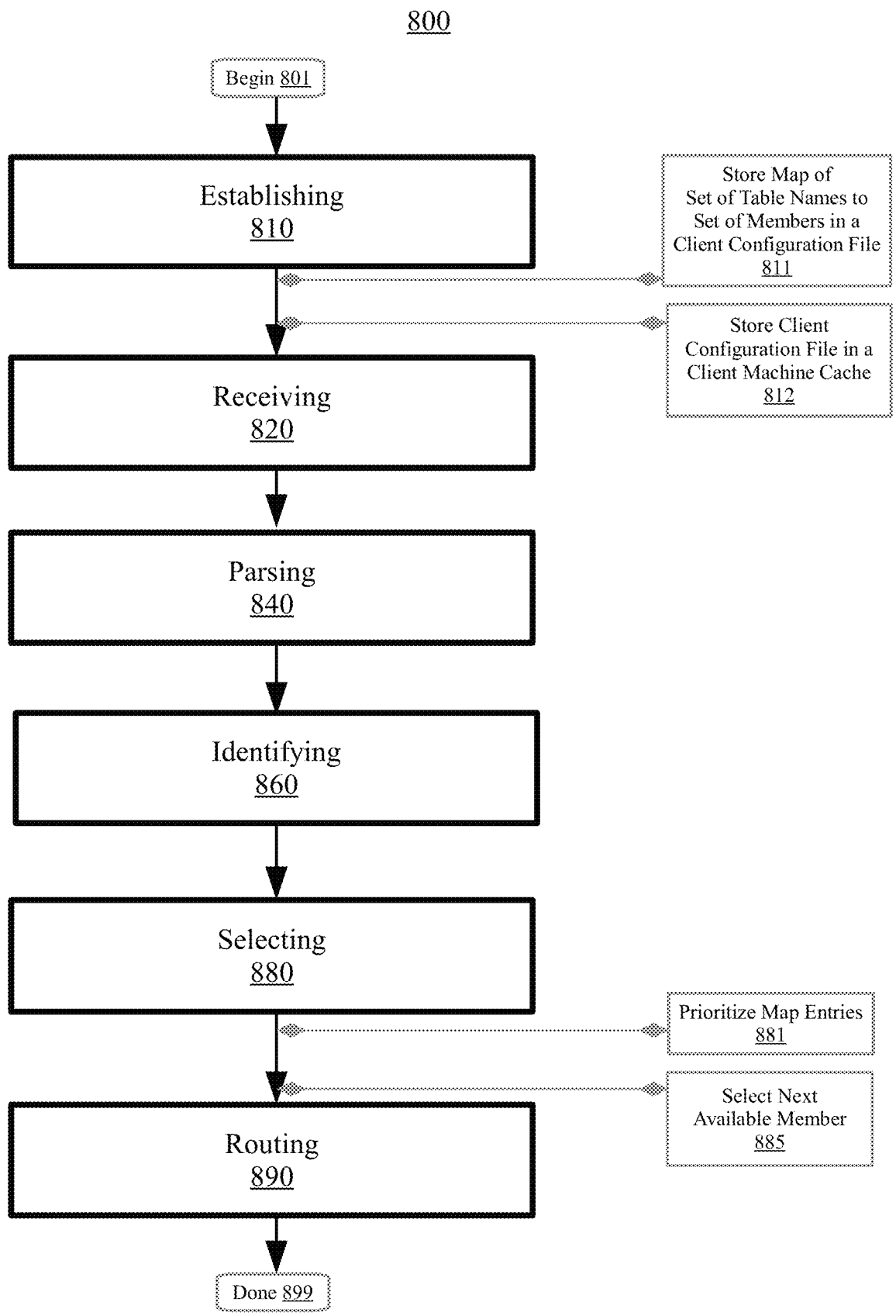
FIG. 8 is a flowchart illustrating a method for managing an access operation request to a database management system on a shared pool of configurable computing resources, according to embodiments.

FIG. 8 is a flowchart illustrating a method 800 for access operation request management, according to embodiments. Aspects of FIG. 8 relate to implementing aspects of access operation request management in a client-side environment. Aspects of method 800 may be similar or the same as aspects of method 600/700, and aspects may be utilized interchangeably with one or more methodologies described herein. The method 800 may begin at block 801. At block 810, a map of a set of table names to the set of members may be established with respect to the DBMS on the shared pool of configurable computing resources. A respective table name of the set of table names may map to an indicated member of the set of members. At block 820, a query may be received. The query may indicate the access operation request to the DBMS. At block 840, the query may be parsed to identify a mentioned table name. At block 860, the mentioned table name may be identified in the query related to the access operation request to the DBMS. At block 880, a specific member of the set of members may be selected by comparing the mentioned table name with the map. The specific member of the set of members may be configured to process the access operation request to the DBMS. At block 890, the access operation request may be routed to the specific member of the set of members to process the access operation request to the DBMS.

In embodiments, a map of table names may be stored at block 811. The map of the set of table names to the set of members may be stored in a client configuration file by a client of the shared pool of configurable computing resources. In embodiments, as described herein, aspects of access operation request management may be implemented in a client-side environment. Accordingly, in embodiments, the map of a set of table names may be stored in a client configuration file by a client. Generally, storing can include recording, saving, caching, or otherwise maintaining the map in the client configuration file. The client may include a piece of hardware or software configured to access a service provided by a server. The client configuration file may include a file that contains a collection of instructions, parameters, settings, directives, and other information that defines how a particular client device operates. For instance, the client configuration file may designate how the client connects with one or more servers (e.g., which communication protocols to use, which authentication information is necessary), which processes to initiate on startup, how to handle particular types of requests/operations, which members are part of which logical groups, and the like. In embodiments, storing the map may include generating a new section within the configuration file, and saving the map in a machine-readable format (e.g., such that the server may interpret and implement the specified mapping) in the newly-created section. Accordingly, in certain embodiments, in response to receiving an access operation request, a member may consult the map stored in the client configuration file to facilitate routing of the request to the corresponding member specified by the map. Other methods of storing the map in the client configuration file are also possible.

In embodiments, a client configuration file may be stored in a cache of the machine having the client at block 812. Generally, storing can include recording, saving, caching, or otherwise maintaining the cache configuration file in a cache of the machine having the client. The cache of the machine having the client may include a portion of high-availability (e.g., continuously accessible to a processor or database manager), low-latency memory configured to store data used by the client. In certain embodiments, the machine having the client may include a computer hardware device that is physically separate from the server, such that the machine is not included as a member of the set of members. In embodiments, storing may include ascertaining a cache size (e.g., 64 megabytes) of the cache of the machine having the client, and formatting the map to a have a data size that may be stored in the cache without impacting the cache usage of other client operations. The client configuration file may be written into the cache of the machine having the client such that, in the event that an access operation request is received by the machine having the client, the access operation request may be routed to a corresponding member/client machine based on the map. Other methods of storing the client configuration file in a cache of the machine having the client are also possible.

In embodiments, map entries may be prioritized at block 881. A first set of map entries of the client configuration file may be prioritized with respect to a second set of map entries of a server configuration file. The first set of map entries may indicate a client routing preference. The second set of map entries may indicate a server routing preference. Aspects of the disclosure relate to the recognition that, in embodiments, a map of table names and members may be maintained by both the client side (e.g., in a client configuration file) and server side (e.g., in a server configuration file) of a network environment. Accordingly, in such a situation, aspects of the disclosure relate to prioritizing the client configuration file with respect to the server configuration file. Generally, prioritizing can include weighting, expediting, preferring, or otherwise giving precedence to the first set of map entries of the client configuration file. The first set of map entries may include a first version of the map that indicates a client routing preference (e.g., mapping of tables with members based on the configuration of the client). The second set of map entries may include a second version of the map that indicates a server routing preference (e.g., mapping of tables with members based on the configuration of the server). In embodiments, prioritizing may include superseding the second set of map entries with the first set of map entries. Consider the following example. The first set of map entries may indicate that "Table Y" maps to a "Member2", whereas the second set of map entries may indicate that "Table Y" maps to a "Member9." Accordingly, in response to receiving an access operation request that mentions the "Table Y," the second set of map entries may be superseded (e.g., overridden, ignored) in favor of the first set of map entries, and the access operation request may be routed to "Member2," as indicated by the first set of map entries. Other methods of prioritizing the first set of map entries with respect to the second set of map entries are also possible.

In embodiments, a next available member may be selected at block 885. The next available member may be selected in response to a member error event. Aspects of the disclosure relate to the recognition that, in some situations, a member of the set of members may encounter an error event (e.g., bug, glitch, failure, malfunction, irregularity) that impacts the availability of the member, or the functionality of the member with respect to processing access operation requests. Accordingly, aspects of the disclosure relate to selecting a next available member of the set of members (e.g., in order to replace the malfunctioning member). Generally, selecting can include choosing, picking, electing, specifying, ascertaining, determining, or otherwise designating a next available member of the set of members. In embodiments, selecting may include marking, labeling, tagging, or otherwise indicating a particular member of the set of members as a fall-back (e.g., back-up, replacement) member in case a particular member encounters an error event, such that the indicated fall-back member may automatically assume the mapping assignment and operations of the member that encountered the error event. In embodiments, selecting the next available member may include automatically electing the next member in a member priority option as the fall-back member. The member priority option may include a ranked list of members that defines the order in which fall-back members may be chosen. As an example, consider a member priority option that specifies the following list: table_name1-member1, table_name2-member1, table_name3-member2, table_name4-member2, table_name5-member3, table_name6-member3. Accordingly, in the event that "member1" encounters an error event and becomes unavailable, then access operation requests that reference "table_name1," or "table_name2" may be rerouted to "member2" (e.g., the next member in the member priority option). As another example, in the event that "member3" becomes unavailable as the result of an error event, access operation requests that reference "table_name5," or "table_name6" may be rerouted to "member1" (e.g., the member priority option may wrap around to the beginning of the list). Other methods of selecting a next available member are also possible. The example system 800 concludes at block 899. The example system 800 may provide performance or efficiency benefits (e.g., resource usage efficiency, high availability, operational flexibility) for access operation request management.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments.

Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method for managing an access operation request to a database management system (DBMS) on a shared pool of configurable computing resources having a set of members, the method comprising:
   establishing, with respect to the DBMS on the shared pool of configurable computing resources, a map of a set of table names to the set of members, wherein a respective table name of the set of table names maps to an indicated member of the set of members;
   receiving a query which indicates the access operation request to the DBMS;
   parsing the query to identify a table name based on analyzing a syntax of the query;
   identifying the table name from within the query, based on a set of table identification criteria;
   selecting, based on comparing the table name with the map, a specific member of the set of members to process the access operation request to the DBMS;
   routing, to process the access operation request to the DBMS, the access operation request to the specific member of the set of members;

storing, in a server configuration file by a server of the shared pool of configurable computing resources, the map of the set of table names to the set of members; and updating, by the server, the server configuration file in response to activation of the DBMS.

2. The method of claim 1, further comprising:
carrying-out, to process the access operation request to the DBMS, a table-specific operational lock on the specific member of the set of members.

3. The method of claim 1, further comprising:
carrying-out, to process the access operation request to the DBMS, a table-specific operational lock on the specific member of the set of members without carrying-out a global operational lock on all members of the set of members to process the access operation request to the DBMS.

4. The method of claim 1, further comprising:
refreshing, to process the access operation request to the DBMS, a specific memory page for the specific member of the set of members without refreshing memory pages for all members of the set of members to process the access operation request to the DBMS.

5. The method of claim 1, further comprising:
maintaining, to process the access operation request to the DBMS, a non-shared state for the set of members.

6. The method of claim 1, further comprising:
managing, without regard to a query-type of the query, the access operation request to the DBMS on the shared pool of configurable computing resources having the set of members.

7. The method of claim 1, further comprising:
balancing, based on both the table name and the map of the set of table names to the set of members, an operational load for the set of members.

8. The method of claim 1, further comprising: storing the server configuration file in a set of caches of the set of members, wherein a respective member of the set of members includes a respective cache of the set of caches.

9. The method of claim 1, further comprising:
storing, in a client configuration file by a client of the shared pool of configurable computing resources, the map of the set of table names to the set of members.

10. The method of claim 9, further comprising:
storing the client configuration file in a cache of a machine having the client.

11. The method of claim 9, further comprising:
prioritizing a first set of map entries of the client configuration file with respect to a second set of map entries of a server configuration file, wherein the first set of map entries indicates a client routing preference, and wherein the second set of map entries indicates a server routing preference.

12. The method of claim 1, further comprising: structuring the map to route a first set of operations of a first application program to a first member of the set of members; and
structuring the map to route a second set of operations of a second application program to a second member of the set of members.

13. The method of claim 1, further comprising:
structuring the map to route a set of read-type operations to a first member of the set of members; and
structuring the map to route a set of write-type operations to a second member of the set of members.

14. The method of claim 1, further comprising:
selecting, in response to a member error event, a next available member.

15. The method of claim 1, wherein the establishing, the receiving, the parsing, the identifying, the selecting, and the routing each occur to manage the access operation request.

16. The method of claim 1, wherein the establishing, the receiving, the parsing, the identifying, the selecting, and the routing each occur in an automated fashion without user intervention.

17. A system for managing an access operation request to a database management system (DBMS) on a shared pool of configurable computing resources having a set of members, the system comprising:
a memory having a set of computer readable computer instructions, and a processor for executing the set of computer readable instructions, the set of computer readable instructions including:
establishing, with respect to the DBMS on the shared pool of configurable computing resources, a map of a set of table names to the set of members, wherein a respective table name of the set of table names maps to an indicated member of the set of members;
receiving a query which indicates the access operation request to the DBMS;
parsing the query to identify a table name based on analyzing a syntax of the query;
identifying the table name from within the query, based on a set of table identification criteria;
selecting, based on comparing the table name with the map, a specific member of the set of members to process the access operation request to the DBMS; and
routing, to process the access operation request to the DBMS, the access operation request to the specific member of the set of members;
storing, in a server configuration file by a server of the shared pool of configurable computing resources, the map of the set of table names to the set of members; and
updating, by the server, the server configuration file in response to activation of the DBMS.

18. A computer program product for access operation request management in a database management system (DBMS) on a shared pool of configurable computing resources having a set of members, the computer program product comprising a computer readable storage medium having program instructions embodied therewith, wherein the computer readable storage medium is not a transitory signal per se, the program instructions executable by a processor to cause the processor to perform a method comprising:
establishing, with respect to the DBMS on the shared pool of configurable computing resources, a map of a set of table names to the set of members, wherein a respective table name of the set of table names maps to an indicated member of the set of members;
receiving a query which indicates the access operation request to the DBMS;
parsing the query to identify a table name based on analyzing a syntax of the query;
identifying the table name from within the query, based on a set of table identification criteria;
selecting, based on comparing the table name with the map, a specific member of the set of members to process the access operation request to the DBMS; and
routing, to process the access operation request to the DBMS, the access operation request to the specific member of the set of members;

storing, in a server configuration file by a server of the shared pool of configurable computing resources, the map of the set of table names to the set of members; and updating, by the server, the server configuration file in response to activation of the DBMS.

* * * * *